Patented Dec. 19, 1950

2,534,366

UNITED STATES PATENT OFFICE 2,534,366

PRODUCTION OF POLYMERIC COMPOUNDS

Herman D. Noether, Kew Gardens, N. Y., assignor to Celanese Corporation of America, a corporation of Delaware No Drawing. Application July 28, 1948, Serial No. 41,179

8 Claims. (Cl. 260—79)

This invention relates to the production of polymeric sulfones and relates more particularly to the production of polymeric sulfones by the oxidation of polymeric sulfides.

An object of this invention is the provision of an improved process for the production of polymeric sulfones, such as polyhexamethylene sulfone, by the oxidation of the corresponding polymeric sulfide.

Another object of this invention is the production of polymeric sulfones of improved physical properties, which sulfones possess high thermal stability and enhanced fiber-forming characteristics.

Other objects of this invention will appear from the following detailed description.

It has heretofore been proposed to produce polymeric sulfones by the oxidation of polymeric sulfides. The oxidation reaction employed involved the use of potassium permanganate as the oxidizing agent, the polymeric sulfide being dissolved in an inert solvent such as acetone or benzene, or a mixture thereof containing acetic acid, the oxidizing agent added and the polymeric sulfide reacted at reflux temperature until the desired degree of oxidation is effected. The manganese dioxide formed is then removed and the crude polymeric sulfone remaining is separated from any unreacted polymeric sulfide. The polymeric sulfones obtained by the above process wherein potassium permanganate is employed as the oxidizing agent are crystalline solids and, in the case of polymeric hexamethylene sulfone, the polymer obtained melts at about 196–198° C. The polyhexamethylene sulfone obtained in this manner, however, contains a considerable amount of unstable polymethylene sulfoxide which imparts a pronounced thermal instability to the polymer and impairs its fiber-forming properties. The presence of unstable sulfoxide groups is due to the fact that incomplete oxidation has taken place.

I have now found that polymeric sulfones of substantially improved thermal stability and fiber-forming properties may be obtained by oxidizing polymeric sulfides to the corresponding polymeric sulfones if the oxidation of said sulfides is effected employing a peroxide compound, such as hydrogen peroxide of 30 to 90% strength as the oxidizing agent in a solvent medium comprising concentrated formic acid. Preferably, the concentrated formic acid solvent medium should contain at least 70% by weight of formic acid. Optimum results are obtained when the solvent medium comprises 90% by weight or more of formic acid, the remainder being water. The oxidation reaction is preferably effected at temperatures of 50 to 100° C.

When concentrated formic acid is employed as the reaction medium in accordance with my novel process, the reaction is characterized by the fact that the oxidation products, due to the absence of excessive water, tend to remain in solution in the strong acid and precipitate out only at an advanced stage of oxidation and in a form readily susceptible to final and complete oxidation of any residual sulfoxide groups to the sulfone stage. It is believed that this more effective oxidation is made possible through the formation of an intermediate "peracid" or acyl peroxide characterized by the presence of the group—O—O—O—. While I preferably employ hydrogen peroxide, other peroxide compounds, such as hydrogen peroxide addition products, for example, $2Na_2CO_3 \cdot 3H_2O_2$ and hydroperoxides, such as tertiary butyl hydroperoxide may be employed as these all form peracids with formic acid. The polymeric sulfone formed precipitates as a fine white powder and is easily separated from the reaction medium and requires substantially no further purification in order to be shaped into fibers, for example, by melt-spinning operations.

The polymeric sulfones obtained in accordance with my novel process are free of unreacted polymeric sulfides and partially oxidized unstable polymeric sulfoxides existing either separately or in combination with sulfone groups in the same molecule. Accordingly, they exhibit an appreciably higher melting point than those polymeric sulfones prepared by the oxidation processes described in the prior art. Since said polymeric sulfones are free of polymeric sulfoxides they exhibit substantially improved thermal and color stability characteristics, high molecular weights and, when subjected to fiber-forming operations, as for example, by melt-spinning, the fiber-forming properties of said polymeric sulfones are found to be far more satisfactory.

The polymeric sulfides treated in accordance with my novel process are compounds well known in the art and are linear polymers comprising regularly repeated units of the formula:

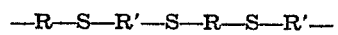

where R and R' are divalent organic radicals, which radicals may be the same or different. Preferably, R and R' contain more than three carbon atoms. As examples of the polymeric sulfides which may be oxidized to polymeric sulfones in accordance with my novel process there may be mentioned polymeric tetramethylene sulfide, polymeric pentamethylene sulfide, polymeric hexamethylene sulfide, polymeric octamethylene sulfide, polymeric decamethylene sulfide, polymeric dodecamethylene sulfide, polymeric p-xylylene sulfide, polymeric p,p'-diphenylene sulfide and polymeric dibutylene ether sulfide. The polymeric sulfides in which R and R' are different radicals, as stated, may also be oxidized in accordance with my novel process to the corresponding polymeric sulfones.

In order further to illustrate my invention, but without being limited thereto, the following examples are given:

Example I

One part by weight of finely divided polymeric hexamethylene sulfide, having an intrinsic viscosity of 0.64 in 1% metacresol solution, is dispersed in 40 parts by weight of 90% aqueous formic acid. The reaction medium is heated to 50° C., and then one part by weight of 30% aqueous hydrogen peroxide is gradually added with agitation at such a rate to maintain an approximate constant reaction temperature, this amount being about the theoretical quantity necessary to form the sulfoxide. During the addition of the peroxide the dispersion changes into a clear solution. An additional one part by weight of hydrogen peroxide is then added also at the above specified rate, this being about the theoretical amount necessary to form the sulfone. At about this stage precipitation of the polysulfone begins to take place as a fine white powder. The reaction is continued and two more parts (100% excess) of hydrogen peroxide is added in the same manner as previously described in order to insure complete oxidation of any residual sulfoxide groups. The precipitate is then poured into water, filtered, washed with water and dried. The yield is almost quantitative. The polyhexamethylene sulfone obtained has a melting point of 212° C., has an intrinsic viscosity of 0.71; the ratio of intrinsic viscosity of the sulfone to sulfide is 1.11.

When the polymeric hexamethylene sulfone is melted and heating is continued further, practically no change in color is observed when the temperature reaches 225° C., and the molten polymeric sulfone turns only a slight amber color at 270° C., indicating high thermal stability. On being melt spun into filaments at 230° C., the polymeric hexamethylene sulfone exhibits excellent fiber-forming properties, good color, high tenacity and cold draw.

When the oxidation reaction is conducted at higher temperatures the following results are obtained.

| Temp. of Oxidation | I. V. of Sulfone | I. V. Sulfone / I. V. Sulfide (.64) | M. P., °C. | Thermostability |
|---|---|---|---|---|
| 60° C. | .66 | 1.03 | 219 | practically no change at 225° C., only slight amber at 286° C. |
| 70° C. | .69 | 1.08 | 219 | Do. |
| 80° C. | .71 | 1.11 | 218 | Do. |
| 90° C. | .69 | 1.08 | 218 | Do. |
| 100° C. | .68 | 1.06 | 219 | Do. |

Example II 3 parts by weight of polymeric hexamethylene are dispersed in 126 parts by weight of 90% formic acid and 7.7 parts by weight of $H_2O_2$, 30%, are added as above described at 70° C. The polysulfone precipitates from solution when nearly all the peroxide is added. It shows good fiber-forming properties and a melting point of 218° C.

Example III 2 parts by weight of polymeric hexamethylene sulfide are dispersed in 155 parts by weight of 90% formic acid and a dispersion of 9.0 parts by weight of sodium carbonate peroxide in 60 parts by weight of water is gradually added at 70° C. The usual solution occurs when 30 to 40 parts by weight have been added and the white polysulfone precipitates out when 45 to 50 are added. The polymer is treated as usual and shows a melting point of 213° C.

Example IV 2 parts by weight of polymeric hexamethylene sulfide are dispersed in 90 parts by weight of 98 to 100% formic acid at 70° C., and on addition of 2.6 to 3 parts by weight of 30% $H_2O_2$ goes into solution very quickly. The temperature is now raised to 80° C., and 8 parts by weight of 30% $H_2O_2$ (100% excess) are gradually added. The polymer remains in solution after this and a further addition of 2½ parts by weight of 30% $H_2O_2$ is required to precipitate the polymeric sulfone. The polymer after washing and drying has a melting point of 216° C., an intrinsic viscosity of 0.64 and exhibits very good fiber-forming properties.

Example V 2.8 parts by weight of polydibutyl ether sulfide with repeating group $-(CH_2)_4-O-(CH_2)_4-S-$ are dispersed in 84 parts by weight of 90% formic acid at 60° C. After the gradual addition of 5.5 parts by weight of $H_2O_2$ (30%), theoretical amount plus 100% excess and stirring for one hour the solution is precipitated in water. The fine white powder has a M. P. of 120° C., on melt spinning shows fiber properties and has a sulphur content of 16.22% (theory 16.65%).

Example VI 3 parts by weight of polydibutyl ether tetramethylene sulfide are dispersed in 115 parts by weight of 90% formic acid at 60° C. After adding 10 parts by weight of 30% $H_2O_2$ and stirring for 2 hours after this, the solution is poured into water. The white powder has fiber forming properties with a melting point of 176° C.

Example VII 5 parts by weight of polymeric hexamethylene tetramethylene sulfide are dispersed in 230 parts by weight of 90% formic acid at 60° C. and 21 parts by weight of 30% $H_2O_2$ are added in the usual manner described above. The polymeric sulfone after washing and drying has a melting point of 246° C., and shows good fiber-forming properties.

The intrinsic viscosity of the polymer is given by the relationship $$\frac{\log_e \frac{f_s}{f_0}}{C}$$

where $f_s$ and $f_0$ are the flow times in a suitable viscosimeter of a 1% solution of the polymer in meta-cresol and of meta-cresol at about 25° C. and C is the concentration of the polymer in grams per 100 cc. of solvent. Preferably, in order to exhibit good fiber-forming qualities, the intrinsic viscosity of the polyhexamethylene sulfone, for example, should be greater than 0.4. Furthermore, I have found that the ratio of the intrinsic viscosity of the polysulfone to the polysulfide gives a measure as to the retention of high molecular weight during the oxidation. The higher this ratio the less degradation in molecular weight takes place. In the case of polyhexamethylene sulfone a ratio of 0.9 to about 1.25 produces satisfactory fiber-forming polymers. The polysulfide employed would have an intrinsic viscosity of about 0.4.

It is to be understood that the foregoing detailed description is given merely by way of illustration and that many variations may be made therein without departing from the spirit of my invention.

Having described my invention, what I desire to secure by Letters Patent is:

1. In a process for the production of a polymeric sulfone from the corresponding polymeric sulfide, the step which comprises oxidizing said polymeric sulfide with a peroxide in a reaction medium comprising concentrated formic acid.

2. In a process for the production of a polymeric sulfone from the corresponding polymeric sulfide, the step which comprises oxidizing said polymeric sulfide with hydrogen peroxide in a reaction medium comprising concentrated formic acid.

3. In a process for the production of polymeric hexamethylene sulfone, the step which comprises oxidizing polymeric hexamethylene sulfide with a peroxide in a reaction medium comprising concentrated formic acid.

4. In a process for the production of polymeric hexamethylene sulfone, the step which comprises oxidizing polymeric hexamethylene sulfide with hydrogen peroxide in a reaction medium comprising concentrated formic acid.

5. In a process for the production of polymeric hexamethylene sulfone, the step which comprises oxidizing polymeric hexamethylene sulfide with sodium carbonate peroxide in a reaction medium comprising concentrated formic acid.

6. In a process for the production of polymeric hexamethylene sulfone, the step which comprises oxidizing polymeric hexamethylene sulfide with hydrogen peroxide in a reaction medium comprising concentrated formic acid until the polymeric hexamethylene sulfone formed precipitates from the reaction medium.

7. In a process for the production of polymeric hexamethylene sulfone, the step which comprises oxidizing polymeric hexamethylene sulfide with hydrogen peroxide at a temperature of 50 to 100° C. in a reaction medium comprising concentrated formic acid until the polymeric hexamethylene sulfone formed precipitates from the reaction medium.

8. In a process for the production of polymeric hexamethylene sulfone, the step which comprises oxidizing polymeric hexamethylene sulfide with hydrogen peroxide at a temperature of 50 to 100° C. in a reaction medium comprising a concentrated aqueous solution containing at least 70% by weight of formic acid until the polymeric hexamethylene sulfone formed precipitates from the reaction medium.

HERMAN D. NOETHER.

REFERENCES CITED

The following references are of record in the file of this patent:

UNITED STATES PATENTS

| Number | Name | Date |
|---|---|---|
| 2,017,004 | Kirstahler et al. | Oct. 8, 1935 |
| 2,127,400 | Gibbs | Aug. 16, 1938 |
| 2,201,884 | Carothers | May 21, 1940 |